United States Patent [19]
May

[11] 3,866,400
[45] Feb. 18, 1975

[54] FEEDER PANEL FOR A HARVESTING MACHINE

[75] Inventor: Donald L. May, Garfield, Wash.

[73] Assignee: J. E. Love Company, Garfield, Wash.

[22] Filed: Jan. 21, 1974

[21] Appl. No.: 435,000

[52] U.S. Cl. .................................. 56/158, 56/229
[51] Int. Cl. ............................................ A01d 43/00
[58] Field of Search ................. 56/229, 158–191, 56/123–125, 207, 219–227, 257

[56] References Cited
UNITED STATES PATENTS

| | | | |
|---|---|---|---|
| 2,102,710 | 12/1937 | Hume et al. | 56/158 |
| 2,599,438 | 6/1952 | Downing et al. | 56/158 |
| 2,720,743 | 10/1955 | Prather | 56/207 |
| 3,388,539 | 6/1968 | Novak | 56/257 |
| 3,412,535 | 11/1968 | Drummond | 56/14.4 |
| 3,813,859 | 6/1974 | Fuller et al. | 56/260 |

*Primary Examiner*—Russell R. Kinsey
*Attorney, Agent, or Firm*—Graybeal, Barnard, Uhlir & Hughes

[57] ABSTRACT

A plurality of hinged feeder panels are provided along the rearward portion of a flexible cutterbar in a crop harvesting machine. Each feeder panel has a lower panel portion which includes an essentially vertical portion, the lower panel portion being secured to the cutterbar by a plurality of hinges. Projecting upwardly and rearwardly from the essentially vertical portion is an upper panel portion, the junction between the vertical portion and the upper panel portion forming a hump over which the cut crop is tipped. The hinges are mounted so as to allow the feeder panel to move relative to the cutterbar as the cutterbar flexes and conforms to the ground contour. Without this relative movement between the feeder panels and the cutterbar, cutterbar flexing will cause fatigue failures in the hinges.

8 Claims, 11 Drawing Figures

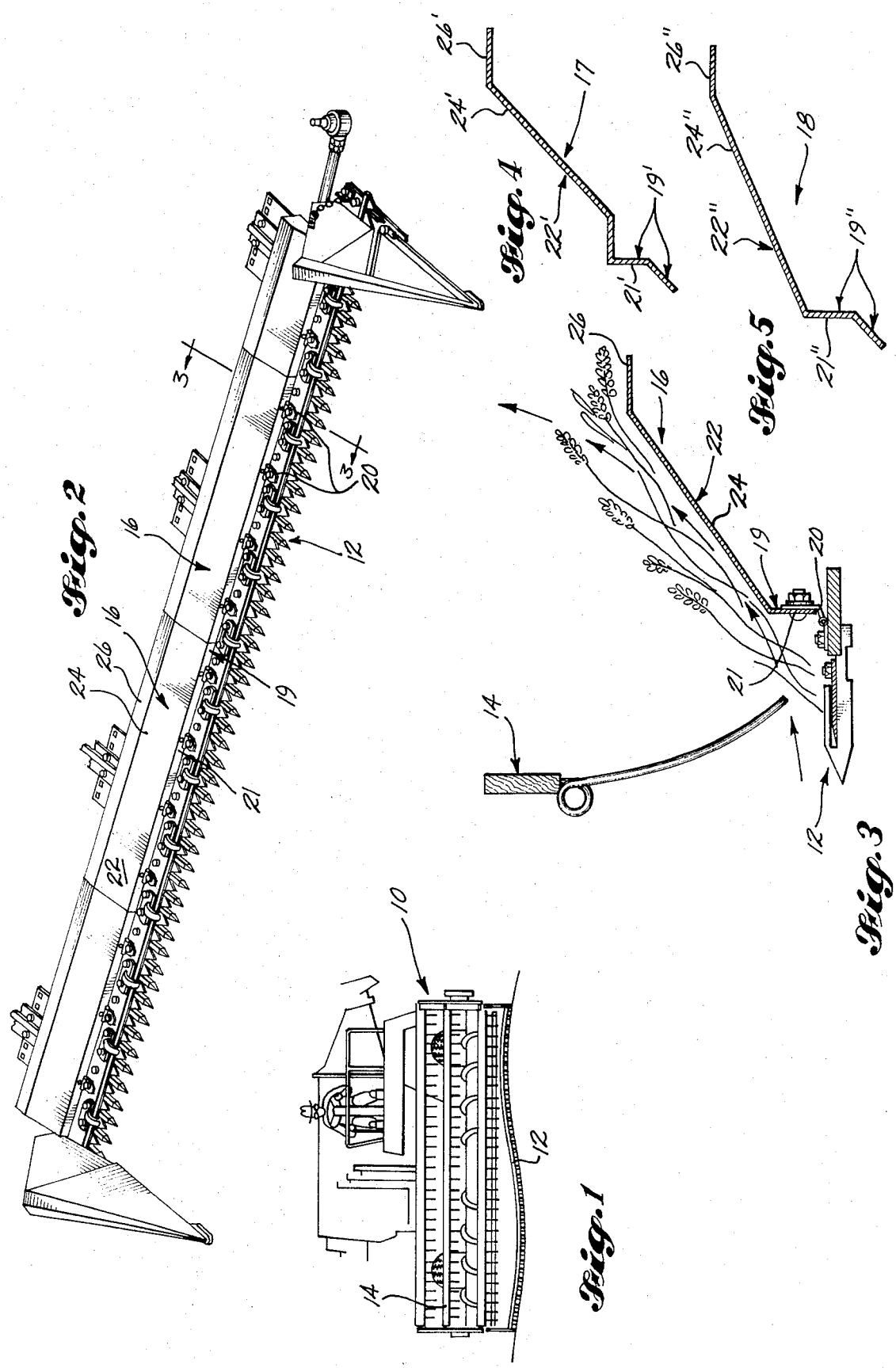

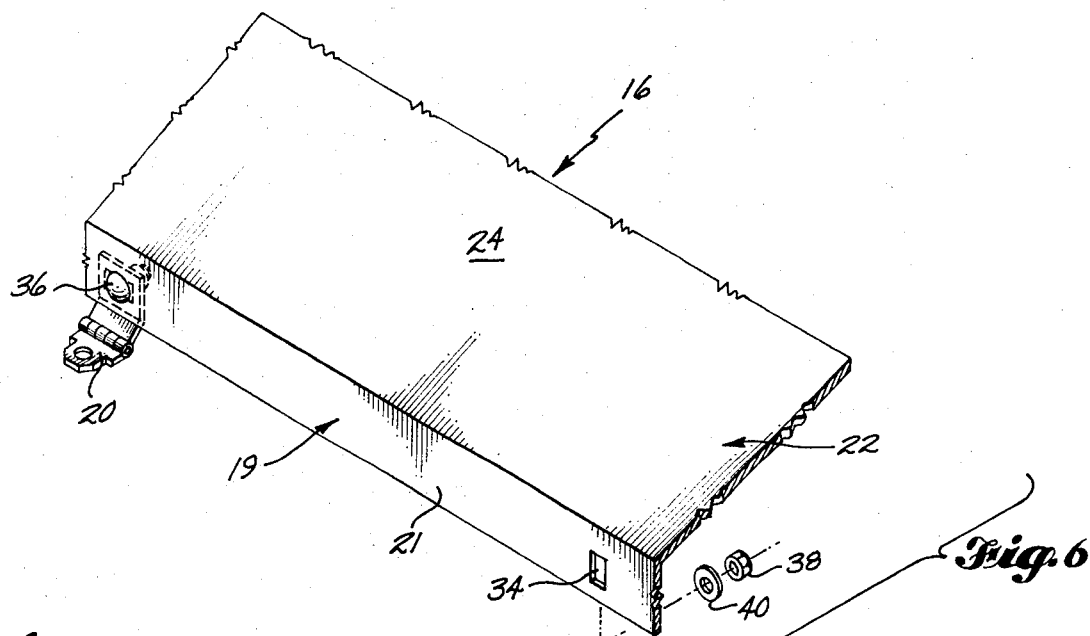
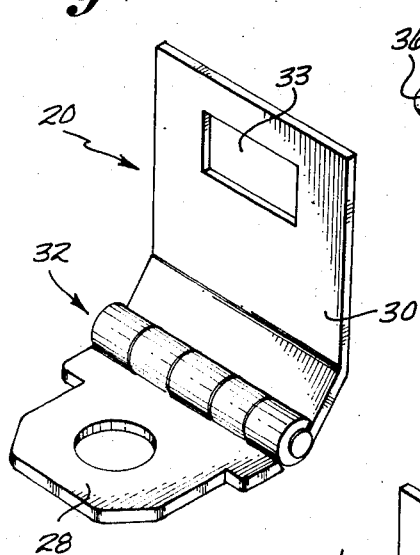
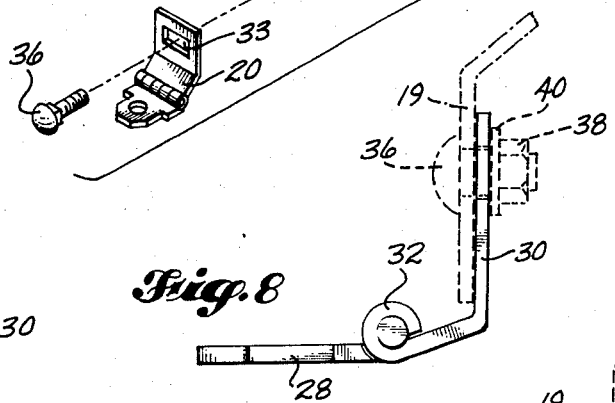
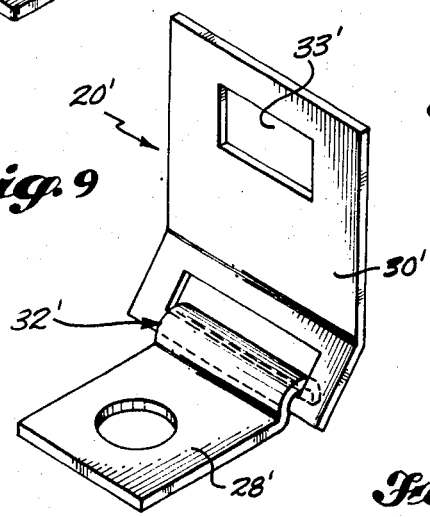
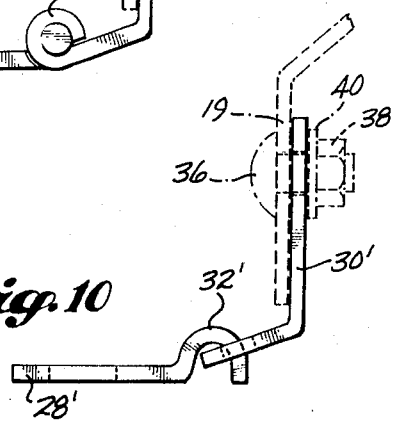
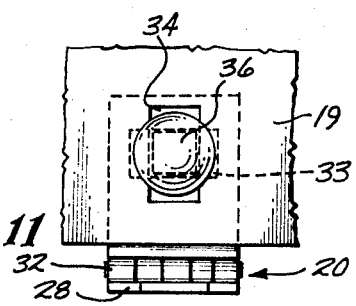

FEEDER PANEL FOR A HARVESTING MACHINE

BACKGROUND OF THE INVENTION

1. Field of the Invention

This invention relates to harvesting machines, and more particularly to an improved feeder panel construction for such machines.

2. Description of the Prior Art

Feeder panels or shields located rearwardly adjacent a floating cutterbar have been used in conjunction with harvesting machines for a considerable period of time. The purpose of such panels is to provide a surface across which the cut crops are fed to the header of the harvesting machines. Examples of these feeder panels can be found in U.S. Pat. No. 855,519; No. 1,806,928; No. 1,996,294; No. 2,599,438; No. 3,388,539; and No. 3,478,499.

Certain problems and difficulties, however, have been associated with such prior art feeder panel designs. One such problem is that gaps in or between the feeder panels are normally provided so that dirt and stones picked up along with the crop can drop back to the ground surface, and such gaps inevitably result in some crop loss. In addition, in order to quickly move the cut crop away from the cutting area and cross the feeder panels into the header of the harvesting machine so as to prevent shatter loss which occurrs by a second cutting of the crop, a quick harvester reel action is generally necessary. Such quick reel action can result in reel threshing and subsequent partial loss of the harvested crop. Finally, prior art feeder panels are generally firmly mounted to the cutterbar so as to move with the cutterbar as it flexes and conforms to the ground surface. This can cause buckling of the feeder panel surfaces and/or fatigue failures of the bolts or hinges which secure the feeder panels to the cutterbar.

SUMMARY OF THE INVENTION

Therefore, it is a primary object of the present invention to provide a feeder panel construction for a harvesting machine which allows the feeder panels to move individually relative to the movement of the cutterbar.

It is another object of the present invention to provide a feeder panel which is adapted to allow quick removal of the cut crop from the cutting area without requiring unduly quick harvester reel action.

It is finally an object of the present invention to provide a feeder panel for a harvesting machine which will eliminate dirt and stones from the harvested crop without increasing crop loss.

To achieve these and other objects and in accordance with the present invention, a plurality of feeder panels are connected to and disposed rearwardly from a flexible cutterbar supported for travel over uneven ground and adapted to conform to the contour thereof. Each feeder panel has a lower panel portion which includes an essentially vertical portion, the lower panel portion being secured to the cutterbar by a plurality of hinges. In preferred form, the lower panel portion consists entirely of the essentially vertical portion. An upper panel portion projects upwardly and rearwardly, preferably at an obtuse angle, from the lower panel vertical portion thereby providing a hump over which the cut crop is tipped.

The hinges are mounted to the lower panel portion in a manner which allows individual movement of the feeder panel relative to the cutterbar as the cutterbar flexes and conforms to the ground contour. In preferred form, this is achieved by providing a rectangular slot in each hinge which is connected by a pin or bolt to a similarly sized rectangular slot in the lower panel portion, the slot in the lower panel portion being oriented essentially perpendicular to the slot in the hinge. In this manner, the pin or bolt is free to traverse the length of either slot thereby enabling the feeder panel to move relative to the cutterbar at each hinge position.

BRIEF DESCRIPTION OF THE DRAWINGS

FIG. 1 is a reduced scale front elevation view of a harvesting machine of a type having feeder panels and a flexible floating cutterbar;

FIG. 2 is a front elevation view of a forward portion of a harvesting machine illustrating a cutterbar and feeder panels;

FIG. 3 is a cross-sectional view taken substantially along line 3—3 of FIG. 2 and illustrating the movement of the harvester reel and the cut crop across the face of the feeder panels;

FIG. 4 is a cross-sectional view similar to FIG. 3 showing a second embodiment of the subject feeder panel;

FIG. 5 is a cross-sectional view similar to FIG. 3 showing another embodiment of the subject feeder panel;

FIG. 6 is an enlarged fragmentary front elevation view of the preferred feeder panel with one hinge attached and one hinge shown in spaced relationship to the feeder panel;

FIG. 7 is a further enlarged front elevation view of one type of hinge utilized with the present invention;

FIG. 8 is an enlarged side elevational view of the hinge shown in FIG. 7, illustrating its positional relationship with the preferred feeder panel when it is attached thereto;

FIG. 9 is an enlarged front elevation view of another type of hinge utilized with the present invention;

FIG. 10 is an enlarged side elevational view of the hinge illustrated in FIG. 9, showing its positional relationship with the preferred feeder panel when attached thereto; and FIG. 11 is an expanded fragmentary front plan view of the hinge of FIG. 7 attached to the preferred feeder panel, illustrating the positional relationship between the slots present in the hinge and in the feeder panel.

DESCRIPTION OF THE PREFERRED EMBODIMENT

FIG. 1 shows a harvesting machine 10 equipped with a floating cutterbar 12. A rotating pick-up reel 14 gathers the growing crop and feeds it to the cutterbar 12 which severs such crop adjacent the group. As more clearly seen in FIGS. 2 and 3, as the machine moves forwardly the cut crop moves upwardly over feeder panels 16 into the collection trough of the harvester's header (not shown). The movement of the reel 14 relative to the cutterbar 12 and feeder panels 16 is indicated by the directional arrows in FIG. 3.

Referring to FIGS. 2 – 5, each illustrated feeder panel 16, 17 and 18 includes a lower panel portion 19, 19' and 19'' which is secured to the cutterbar 12 by a plurality of hinges 20. Each lower panel portion 19, 19' and 19'' includes an essentially vertical portion 21, 21' and 21'', respectively. In the preferred feeder panel embodiment 16, the lower panel portion 19 consists entirely of the essentially vertical portion 21, such construction offering greater simplicity and efficiency. Projecting upwardly and rearwardly from each lower panel vertical portion 21, 21' and 21'' is an upper panel portion 22, 22' and 22'', respectively, which in a preferred embodiment forms an obtuse angle with vertical portions 21, 21' and 21''. In the preferred form, each panel portion 22, 22' and 22'' includes an upwardly and rearwardly projecting section 24, 24' and 24'' and an essentially horizontal section 26, 26' and 26'' which extends rearwardly at an obtuse angle from section 24, 24' and 24'' respectively, sections 26, 26' and 26'' lying immediately above the front rail of the harvester's header.

The angular junction between each upper panel portion 22, 22' and 22'' and the essentially vertical portion 21, 21' and 21'', respectively results in a hump being formed in the feeder panel. The butts of the cut crops are tipped over this hump by the harvester reel bats immediately after cutterbar 12 cuts the crop, thereby enabling quick removal of the cup crop from the cutterbar area so as to reduce shatter loss caused by a second cutting. In addition, this design allows the upper panel portions 22, 22' and 22'' to be flatter than that of prior art designs, thereby reducing the reel action necessary to move the cut crop across the feeder panels into the harvester reel header. This results in even flow of crop material into the combine with a minimum of reel threshing. Furthermore, the forward surface of each lower vertical portion 21, 21' and 21'' retains dirt and stones so that such are not drawn up along with the cut crop into the harvesting machine. It will be noted that this function is achieved without having to provide for gaps or openings in or between the feeder panels through which the dirt and stones can drop. This eliminates crop loss which normally results from such gaps or openings and allows the feeder panels to be fit immediately adjacent each other along the entire length of the cutterbar.

As previously mentioned and as shown in FIG. 1, the cutterbar 12 flexes and bends to follow the contour of the ground when the harvesting machine moves forward. If the feeder panels are firmly connected to the cutterbar so that the feeder panels cannot move independently of the cutterbar, a considerable amount of strain and fatigue develops in the feeder panel surfaces and in the bolts or hinges which connect the panels to the cutterbar. This is due to the fact that the feeder panel do not have the same degree of flexability as the flexible cutterbar. To avoid fatigue failures resulting from such, the present invention provides for independent movement of the feeder panels relative to the cutterbar.

Referring to FIGS. 6–11, the aforementioned function is achieved by securing hinges 20 to the lower panel portion 19 in such a manner as to allow for separate movement of the feeder panel 16. FIGS. 7 and 9 illustrate two different types of hinges which may be utilized with the present invention, although the present invention is not limited thereto. The hinges have cutterbar attachment portion 28, and 28', a feeder panel attachment portion 30, and 30', and a pivotal hinging portion 32 and 32' which enable the feeder panel to be tipped forwardly in order to provide for maintenance of the various machinery assemblies located below the feeder panels.

Each portion 28, 28' may be connected to the cutterbar 12 in any manner, the simplest and preferred manner being to bolt portion 28, 28' to the cutterbar 12. As illustrated in FIGS. 8 and 10, portion 30, 30' is preferably connected to the rearward or interior surface of lower panel portion 19. To achieve the independent movement of feeder panel 16 relative to the cutterbar, in the preferred form a rectangular slot 33, 33' is provided in portion 30, 30' of hinge 20, 20', respectively. A similarly sized rectangular slot 34 is provided in lower panel portion 19, the longitudinal orientation of slot 34 being different from that of slot 33, 33'. In the preferred form, the longitudinal axis of slot 34 is perpendicular to the longitudinal axis of slot 33, 33', one slot preferably being horizontal and the other vertical. Bolt 36 passes through slots 33, 33' and 34 and is provided with nut and washer 38, 40. The diameter of bolt 36 should be such that it is freely movable within slots 33, 33' and 34.

As seen in FIG. 11, nut 36 is free to traverse the horizontal length of slot 33 and the vertical length of slot 34. Inasmuch as hinge 20 is securely fastened to cutterbar 12, this arrangement enables feeder panel 16 to move both horizontally and vertically at each hinge joint independent of the movement of the cutterbar 12. Therefore, cutterbar 12 can dip, rise and slide back-and-forth as it bends and flexes when following the contour of the ground without imparting the same movement to feeder panels 16. This preferred hinge and slot arrangement allows the feeder panels, then, to follow the front rail of the header as the cutterbar bends to conform to the ground contour. Without this movement between the feeder panels and the cutterbar, the cutterbar flexing will cause fatigue failures in the hinges as well as buckling in the skin surfaces of the feeder panels. It should be noted that while the illustrated embodiment shows slots 33, 33' to be horizontal and slots 34 to be vertical, any size or shape orifice may be utilized as well as any orientation of the preferred slots so long as the orifices provide at least two directions of movement between the feeder panels and the cutterbar.

From the foregoing, various modifications of the feeder panel construction and hinge attachment will be apparent to those skilled in the art to which the invention is addressed. It is to be understood, therefore, that the invention is not to be limited to the details given herein and that it may be modified within the scope of the appended claims.

What is claimed is:

1. In a crop harvesting machine having a flexible cutterbar supported for travel over uneven ground and adapted to conform to the contours thereof, and a plurality of feeder panels connected to said cutterbar and disposed rearwardly therefrom, the improvement wherein each of said feeder panels is secured to said cutterbar by a plurality of hinges adapted to allow individual movement of each said feeder panel relative to said cutterbar as said cutterbar flexes and conforms to the ground contour, each feeder panel having a distinct hump in its forward portion proximate to said cutterbar over which the cut crop is tipped to provide quick removal of the cut crop from the vicinity of said cutterbar onto said feeder panel.

2. The improvement according to claim 1, wherein each of said feeder panels comprises a lower panel portion secured to said cutterbar by said hinges, said lower panel portion including an essentially vertical portion, and an upper panel portion projecting upwardly and rearwardly from said essentially vertical portion of said lower panel portion.

3. The improvement according to claim 2, wherein said lower panel portion is essentially vertical, and said upper panel portion projects upwardly and rearwardly at an obtuse angle from said lower, essentially vertical panel portion.

4. The improvement according to claim 2, wherein the junction between said upper panel portion and said essentially vertical portion forms said hump.

5. The improvement according to claim 1, wherein each said feeder panel contains orifices and wherein each said hinge has an orifice aligned with an orifice located in said feeder panel, said hinge being joined to said feeder panel at said orifices which are sized and shaped to provide relative movement between said hinge and said feeder panel.

6. The improvement according to claim 5, wherein the orifices in each said hinge and feeder panel are similarly sized rectangular slots, and wherein pin connecting means pass through said slots to join said hinge to said feeder panel, the slots located in said hinges being longitudinally oriented at an angle to the slots located in said feeder panel.

7. The improvement according to claim 2, wherein said upper panel portion comprises an upwardly and rearwardly directed section orientated at an obtuse angle to said essentially vertical portion, and an essentially horizontal section orientated rearwardly from and at an obtuse angle to said upwardly and rearwardly directed section.

8. The improvement according to claim 2, wherein each said lower panel portion contains rectangular slots, wherein each said hinge has a similarly sized rectangular slot aligned longitudinally at an angle to a slot located in said lower panel portion, and wherein pin connecting means pass through said slots to join said hinge to said lower panel portion to provide relative movement between said hinge and said lower panel portion.

* * * * *